(12) United States Patent
Liu et al.

(10) Patent No.: US 8,908,912 B2
(45) Date of Patent: Dec. 9, 2014

(54) PARTICLE TRACKING METHODS

(75) Inventors: Ke-Yan Liu, Beijing (CN); Liang Tang, Beijing (CN); Lei Wang, Beijing (CN); Wei Liu, Beijing (CN)

(73) Assignee: Hewlett-Packard Development Company, L.P., Houston, TX (US)

(*) Notice: Subject to any disclaimer, the term of this patent is extended or adjusted under 35 U.S.C. 154(b) by 415 days.

(21) Appl. No.: 13/258,476

(22) PCT Filed: Sep. 24, 2009

(86) PCT No.: PCT/CN2009/074168
§ 371 (c)(1),
(2), (4) Date: Nov. 10, 2011

(87) PCT Pub. No.: WO2011/035470
PCT Pub. Date: Mar. 31, 2011

(65) Prior Publication Data
US 2012/0057751 A1 Mar. 8, 2012

(51) Int. Cl.
*G06K 9/00* (2006.01)
*G06T 7/20* (2006.01)
*H04N 7/18* (2006.01)

(52) U.S. Cl.
CPC . *H04N 7/18* (2013.01); *G06T 7/208* (2013.01)
USPC ........................................................ 382/103

(58) Field of Classification Search
USPC ........................................................ 382/103
See application file for complete search history.

(56) References Cited

U.S. PATENT DOCUMENTS

| | | | |
|---|---|---|---|
| 8,300,924 B2 * | 10/2012 | Eaton et al. ................... | 382/159 |
| 2008/0063236 A1 | 3/2008 | Ikenoue et al. | |
| 2009/0238406 A1 * | 9/2009 | Huang et al. .................. | 382/103 |
| 2010/0046823 A1 * | 2/2010 | O Ruanaidh et al. ......... | 382/133 |

FOREIGN PATENT DOCUMENTS

JP 2007233798 A * 9/2007

OTHER PUBLICATIONS

Comaniciu, Dorin, Visvanathan Ramesh, and Peter Meer. "Kernel-based object tracking." Pattern Analysis and Machine Intelligence, IEEE Transactions on 25.5 (2003): 564-577.*
CN101404086A (Univ Zhejiang); Apr. 8, 2009;;ISA 220 ISR & Written Opinion.
CN1992911A Chinese Acad SCI Computing Tech Graduate School; Jul. 4, 2007;;ISA 220 ISR & Written Opinion.
Ke-Yan Liu;Parallel Particle Filter Algorithm in Face Tracking; Multimedia and Expro, 2009 ICME 2009 IEEE International Conference, Jul. 3, 2009; Fig 2;1817-1819; ISA 220 ISR & Written Opinion.

* cited by examiner

*Primary Examiner* — Shefali Goradia

(57) ABSTRACT

A method for tracking an object in a video data, comprises the steps of determining a plurality of particles for estimating a location of the object in the video data, determining a weight for each of the plurality of the particles, wherein the weights of two or more particles are determined substantially in parallel, and estimating the location of the object in the video data based upon the determined particle weights.

12 Claims, 6 Drawing Sheets

PARTICLE TRACKING METHODS

BACKGROUND

It is frequently desired to track object motion in video data. For example, in computer-vision applications it is often desired to track the motion of one or more faces present in video data, although it will be realised that object tracking is not limited to tracking faces. However, it is difficult to track objects present in video data in real-time due to a computation workload of object tracking methods. Furthermore, it is also difficult to track objects in video data due to problems such as partial occlusion or illumination variances.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Particle filter based object tracking is a dynamic state estimation technique based on Monte-Carlo simulation. A particle filter aims to determine a posterior state density $p(s_t|z_t)$ at a time t using a process density $p(s_t|s_{t-1})$ and an observation density $p(z_t|s_t)$ wherein the state of an object, such as a face, at the time t is denoted by $s_t$, its history is $S=\{s_1 \ldots, s_t\}$ and a set of image features at the time t is $z_t$ with a history $Z=\{z_1 \ldots, z_t\}$.

Figure 1:
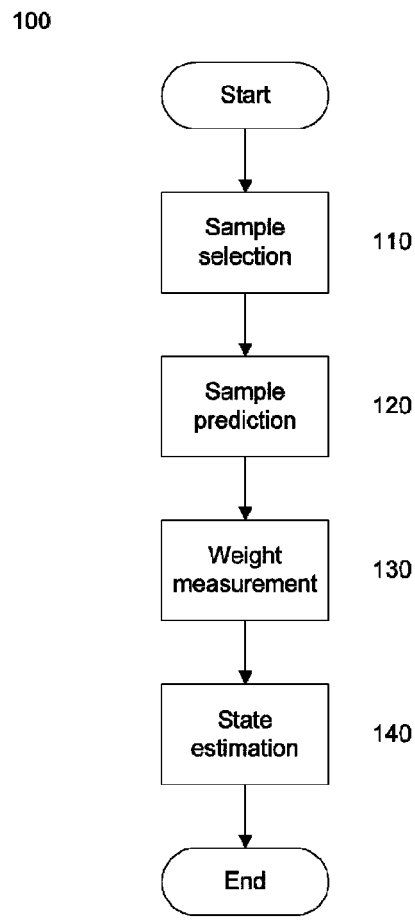
FIG. 1 shows a particle filter tracking method.

As shown in FIG. 1, a method 100 of particle filter tracking comprises four main steps: (1) a sample selection step 110, wherein new samples $s'^{(n)}_t$ are generated from an old sample set $s'^{(n)}_{t-1}$ with weights $\pi^{(n)}_{t-1}$; (2) a prediction step 120, comprising determining new samples with a dynamic model $s^{(n)}_t = s'^{(n)}_t + w^{(n)}_t$ where $w_t$ is Gaussian noise; (3) a weight measurement step 130, wherein weights $\pi^{(n)}_t$ are determined for each of the newly generated samples; and (4) a state estimation step 140, wherein a final state vector is obtained based upon the newly generated samples and weights.

In embodiments of the present invention, particle filter tracking is performed in parallel to improve a computational speed of the particle filter tracking. In particular, weight computation for each of a plurality of samples or particles is performed in parallel. In some embodiments of the invention, the particle filter tracking method is based upon multiple information cues in order to reduce problems, such as illumination and occlusion problems, which can affect object tracking. Furthermore, in some embodiments of the invention, the plurality of processing units on which the method is performed in parallel comprise a combination of one or more processors, or cores of one or more multi-core processors, and multiple processors or cores of a graphics processing unit (GPU).

Figure 2:
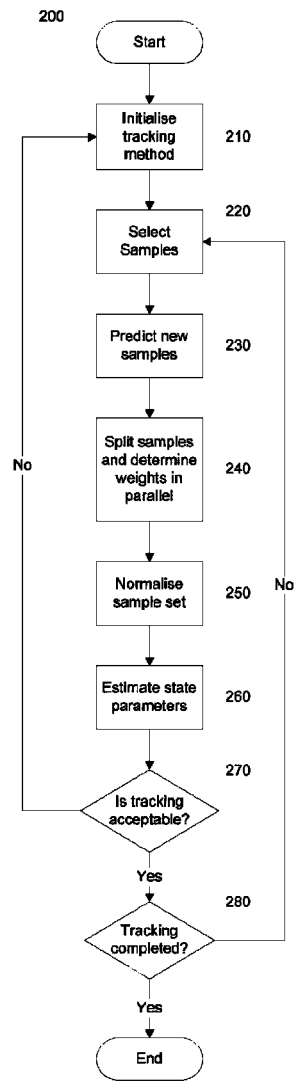
FIG. 2 shows a particle filter tracking method according to an embodiment of the invention.

A method 200 of particle filter tracking according to an embodiment of the present invention will now be described with reference to FIG. 2.

In step 210 an initialisation process is performed to detect one or more objects to track in a video image. An initialisation method, such as that described in "Rapid Object Detection using a Boosted Cascade of Simple Features" by P. Viola and M. Jones (IEEE Computer Society Conference on Computer Vision and pattern Recognition, 2001:511-518), which is herein incorporated by reference, may be performed in step 210. Re-initialisation using such a method may also be performed when a tracking failure occurs, as will be explained. As a result of the initialisation step 210, one or more regions of a video image are determined which contain predetermined objects to track, such as a face of a person. In the following description it will be assumed that the video image contains a single face, although the present invention is not limited in this respect. The region may be a rectangular region R represented by $R=(C_x,C_y,W,H)$ where $(C_x,C_y)$ is a position of a centroid and W, H is a width and height of the rectangle, respectively. Alternatively, a square centroid may be used in which only one of W or H is defined.

Figure 3:
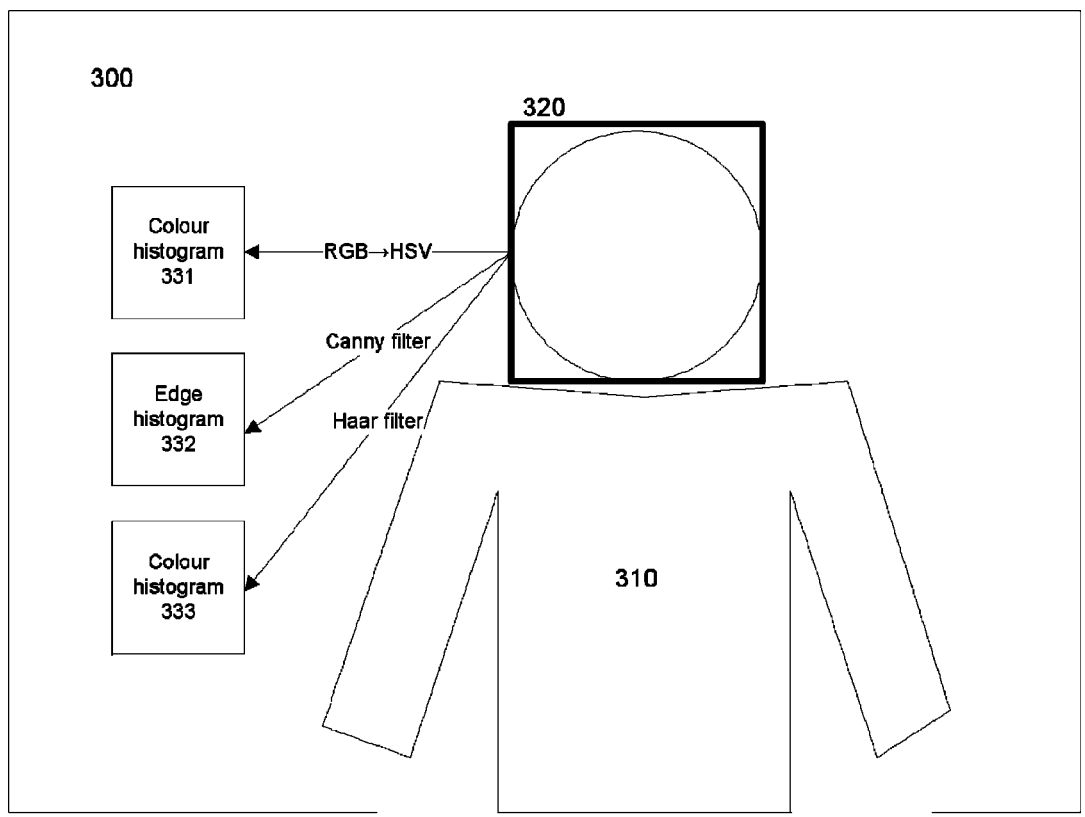
FIG. 3 shows an illustration of a video image including a region selected to contain a predetermined object according to an embodiment of the invention.

FIG. 3 illustrates a video image 300 which contains an upper-torso of a person 310. As a result of the initialisation step 210, a region R 320 is determined to contain the predetermined object, in the present example the face of the person 310.

Steps 220-260 of the method 200 represent the particle filter tracking steps wherein a probability density is propagated from $\{(s^{(n)}_{t-1}, \pi^{(n)}_{t-1}, c^{(n)}_{t-1})\}$ to $\{(s^{(n)}_t, \pi^{(n)}_t, c^{(n)}_t)\}$, where $c^{(n)}_t$ indicates a cumulative weight for the $n^{th}$ sample at time t.

In step 220 for n=1:N wherein N is a total number of samples, a sample set $s'^{(n)}_t$ is generated by determining a random number $\alpha \in [0,1]$ which is uniformly distributed and the finding the smallest j such that $c^{(j)}_{t-1} \geq \alpha$ and setting $s'^{(n)}_t = s^j_{t-1}$.

In step 230 a prediction step is performed to determine $s^{(n)}_t = s'^{(n)}_t + w^{(n)}_t$ where, as discussed above, $w^{(n)}_t$ is Gaussian noise.

In step 240, the plurality of samples is divided amongst M groups, wherein weights for the plurality of the samples in each group are to be determined at least partly in parallel. In some embodiments of the invention a weight of samples in each group is allocated to a respective computation thread i.e. there are M threads. However, it will be realised that the weight of samples in each group may be determined by more than one thread. In some embodiments a weight of each sample is determined by a respective thread. In some embodiments each of the M groups is allocated to a different processing unit in a multi-core or multi-processor system. Alternatively, each group may be allocated to a graphics processing unit (GPU) for processing as a block of threads. Furthermore, in some embodiments, the groups may be divided between one or more processing units and the GPU. Embodiments of determining the weight of each sample are explained below.

In step 250 the sample set is normalised such that $\Sigma_n \pi^{(n)}_t = 1$ and the cumulative frequency $c^{(n)}_t \geq \alpha$ is updated by $c^{(n)}_t = c^{(n-1)}_t + \pi^n_t, c^{(0)}_t = 0$.

In step 260 state parameters at time t are estimated by $$t:\hat{s} = \frac{\sum_{i=1}^{N} \pi_t^{(i)} s_t^{(i)}}{\sum_{i=1}^{N} \pi_t^{(i)}}.$$

In step 270 it is determined whether the method 200 has reliably tracked the object in the video data. In embodiments of the invention, tracking reliability is determined based on a maximum weight value determined for the samples in step 240. If the maximum weight value is less than a predetermined threshold value for a predetermined number of video frames, then it is determined that tracking of the object has been lost. If the maximum weight is less than the threshold value, indicating that the confidence value is unacceptable, then the method returns to step 210 for re-initialisation of the method i.e re-detection of object(s) in the video data. However, if the tracking reliability is acceptable then the method continues to step 280.

In step 280 it is determined whether tracking of the object has been completed. For example, it is determined in step 280 whether tracking of the object has been ended by a user. If tracking has been ended then the method ends, otherwise the method returns to step 220.

A method of determining the weight of each sample, as in step 240, according to an embodiment of the invention will now be explained.

In embodiments of the invention, sample weights are determined using a plurality of sub-processes each based on a respective information cue. In embodiments of the invention, the multiple information cues are a colour histogram 331, an edge histogram 332 and wavelet features 333 determined from the region R 320. It will be realised that not all three cues are required and that, for example, just a colour and edge histogram 331, 332 may be used. The weight of an nth sample is obtained by combining the individual weights based on each information cue.

The colour histogram 331 is used to at least partly overcome the problem of changes in illumination. A colour histogram $H^{colour}$ is determined in the HSV colour space as $H^{colour} = \{h_i^{colour}\}_{i=0}^{B_c-1}$ where $B_c$ is a number of bins used. The sample weight $P_n^{colour}$ may be determined according to the colour histogram based upon a similarity between the sample histogram $H_n^{colour}$ and a reference histogram template $H_{ref}^{colour}$. The similarity may be determined by a Battacharyya similarity function D as:

$$P_n^{colour} = \exp\{-D^2(H_n^{colour}, H_{ref}^{colour})\} \text{ with}$$

$$D(H_n^{colour}, H_{ref}^{colour}) = \left(1 - \sum_{i=0}^{B-1} \sqrt{h_{i,n}^{colour} \cdot h_{i,ref}^{colour}}\right)^{1/2}$$

A weight $P^{edge}$ based upon the edge orientation histogram 332 $H^{edge} = \{h_i^{edge}\}_{i=0}^{B_c-1}$ may be determined according to an edge image produced by a Canny filter. The sample weight $P_n^{colour}$ may be determined based on the edge orientation histogram 332 and a reference histogram $H_{ref}^{edge}$ as:

$$P_n^{edge} = \exp\{-D^2(H_n^{edge}, H_{ref}^{edge})\} \text{ with}$$

$$D(H_n^{edge}, H_{ref}^{edge}) = \left(1 - \sum_{i=0}^{B-1} \sqrt{h_{i,n}^{edge} \cdot h_{ref}^{edge}}\right)^{1/2}$$

A weight $P^{wavelet}$ may be determined according to wavelet features 333 based upon vertical and diagonal coefficients calculated by wavelet transformations with different scales. Final wavelet features $V^{wavelet}$ may be determined as $V^{wavelet} = \{v_i^{wavelet}\}_{i=0}^{D-1}$ where D is a number of feature dimensions. A sample weight $P_n^{wavelet}$ may be determined based upon the wavelet features, Euclidean distance between a sample feature vector $V_n^{wavelet}$ and a reference feature vector $V_{ref}^{wavelet}$ as:

$$P_n^{wavelet} = \exp\{-Eu(V_n^{wavelet}, V_{ref}^{wavelet})\} \text{ with}$$

$$Eu(V_n^{wavelet}, V_{ref}^{wavelet}) = \left(\sum_{i=0}^{B-1} (v_{i,n}^{wavelet} - v_{i,ref}^{wavelet})^2\right)^{1/2}$$

A final weight for the nth sample is then determined as:

$$p(z_t^n | s_t^n) = \alpha_{colour} P_n^{colour} + \alpha_{cedge} P_n^{edge} + \alpha_{wavelet} P_n^{wavelet}$$

Where $\alpha_{colour}$, $\alpha_{edge}$ and $\alpha_{wavelet}$ are predetermined coefficient values for each information cue. Each coefficient value may be determined empirically prior to the method 200 being executed. In one embodiment, $\alpha_{colour} = \alpha_{edge} = \alpha_{wavelet} = \frac{1}{3}$ such that each information cue is given an equal prominence in determining the weight of each sample. It will be realised, however, that other coefficient values may be used and that a coefficient for each information cue may be different.

As noted above, embodiments of the invention parallelise the determination of sample or particle weights in order to improve performance. In some embodiments of the invention, the sample weights are determined in parallel based upon a plurality of information cues. In particular, some embodiments of the invention use the information cues of colour histogram, edge orientation and wavelet features, as discussed above.

In some embodiments of the invention, a weight of each sample or particle is determined by a separate thread. The total number of particles may be expressed as particle_num and a maximum number of available processing units, either on a CPU, GPU or as a combination of CPU and GPU processing units, is max_core the number of particles for which a weight is to be determined on each processing unit partcleNum_on_everyCore is determined as:

$$\text{particleNum\_on\_everyCore} = \frac{\text{particle\_num}}{\text{max\_core}}$$

To determine sample weights in parallel on one or more multi-core processors, or using multiple processors which may each include one or more cores, embodiments of the present invention use a map-reduce programming model. The map-reduce programming model, such as the MapReduce model provided by Google, Inc., uses a map function to process a key/value pair to generate a set of intermediate key/value pairs, and a reduce function that merges all intermediate values associated with the same intermediate key. Use of such a map-reduce programming model enables the parallelisation of computing problems, such as sample-weight determination as in embodiments of the present invention.

Figure 4:
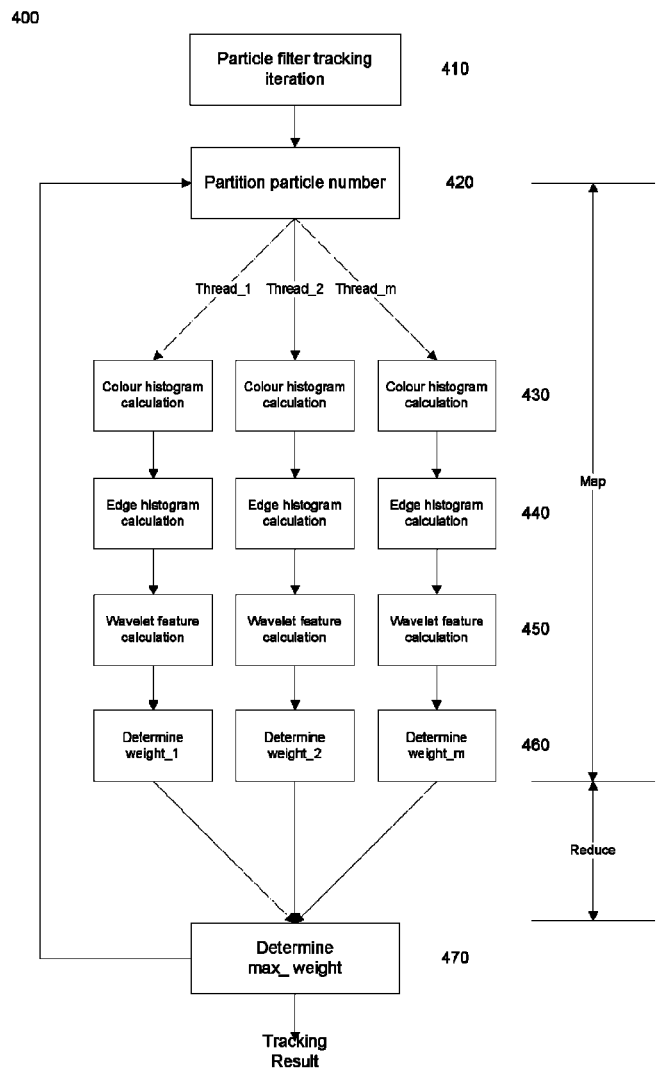
FIG. 4 shows a multi-core implementation of a particle filter method according to an embodiment of the invention.

FIG. 4 illustrates a multi-core or multi-processor particle filter method 400 according to an embodiment of the present invention. In step 410 a new iteration of the particle filter tracking method is performed, which includes selecting samples and sample prediction as in steps 220 and 230 of FIG. 2. In step 420 particles are partitioned amongst a plurality of processing units i.e. processor cores and/or processors. As discussed above, a number of samples or particles, partcle-Num_on_everyCore, is allocated to each processing unit. In steps 430-450 a weight is determined for each sample based upon each of the colour histogram 331 $P_n^{colour}$, edge histogram 332 $P_n^{colour}$ and wavelet features 333 $P_n^{wavelet}$, respectively, as described above. In step 460 a final weight $p(z_t^n|s_t^n)$ is determined for each sample. In step 470 an overall weight is selected from the samples as a sample having a maximum weight, which is provided as feedback to step 420 for a next iteration of the method 400. FIG. 4 also indicates a division of the method between the map and reduce operations discussed above. In the case that each thread is allocated a group of samples, e.g. 1000 samples, then in step 460 a sample having a maximum weight is selected from amongst each group and in step 470 a sample is selected having the maximum weight from amongst those previously selected.

Embodiments of the present invention may also utilise a GPU to determine sample or particle weights in parallel. In embodiments of the invention, a GPU, such as Nvidia's G80 GPU, is used to determine sample weights in parallel. The G80 architecture supports the processing of blocks of 64 to 512 threads, wherein blocks are divided into groups of 32 called warps.

Figure 5:
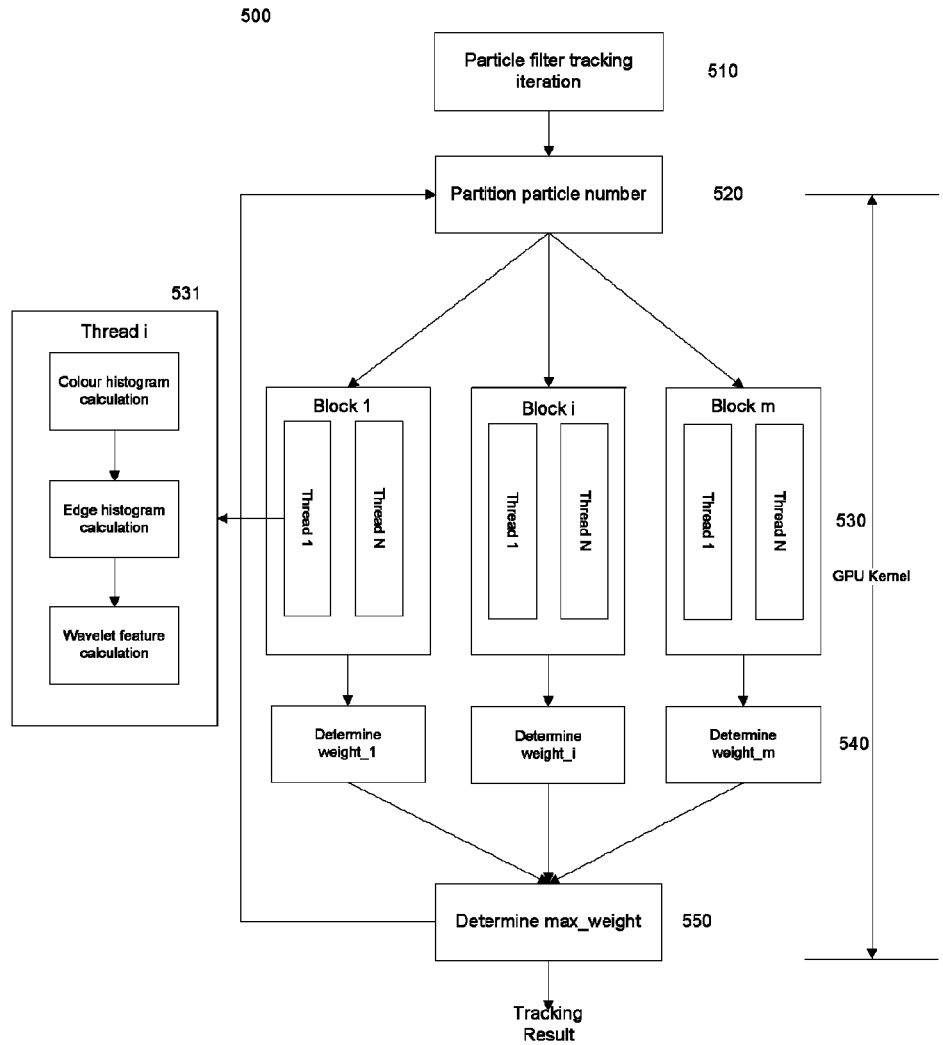
FIG. 5 shows a graphics processing unit implementation of a particle filter method according to an embodiment of the invention.

A GPU-based particle filter tracking method 500 according to an embodiment of the invention is shown in FIG. 5. Step 510 and 520 in FIG. 5 correspond to steps 410 and 420 in FIG. 4. However, in step 520 samples or particles are allocated amongst M blocks having N samples or particles in each block. Each block is allocated by a kernel of the GPU to a processor of the GPU. In step 530 weights for each of the plurality of samples are determined in parallel by processors of the GPU. As with the previously described embodiment, the weight of each sample may be determined by a thread 531 based upon a plurality of information cues. In step 540 a maximum weight for each block is determined and in step 550 a maximum particle weight from the particles is determined.

Figure 6:
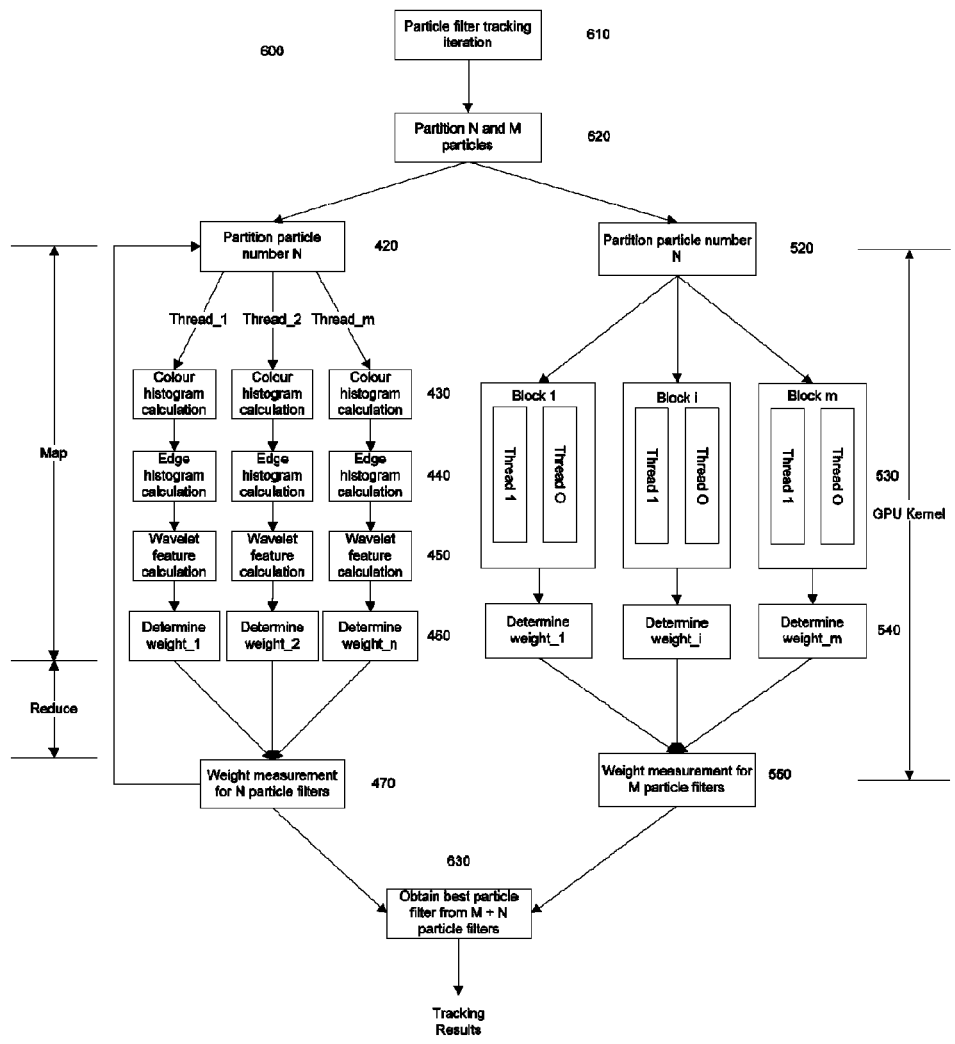
FIG. 6 is a combined multi-core and graphics processing unit implementation of a particle filter method according to an embodiment of the invention.

FIG. 6 illustrates a method 600 according to a further embodiment of the invention in which a weight of a plurality of samples is determined in parallel by one or more CPU-based processing units alongside a GPU as a General Purpose Graphics Processing Unit (GPGPU). The method 600 combines steps of the previously described methods 400, 500 shown in FIGS. 4 and 5.

Step 610 corresponds to steps 410 and 510. In step 520 a plurality of samples for which weights are to be determined is partitioned into groups of N and M particles respectively. Weights for the group of N particles will be determined by a plurality of cores and/or processors at least partly in parallel, whilst weights for the group of M will be allocated to the GPU for determining at least partly in parallel. The groups of N and M particles are determined at least partly in parallel with each other. Steps 420-470 and 520-55 are as previously described with reference to FIGS. 4 and 5 respectively. In step 630 a best particle filter is obtained from the groups of N and M particle filters, respectively, i.e. a particle filter having the greatest weight.

Embodiments of the present invention provide sample or particle weight determination simultaneously using one or more processors or cores of a processor and the GPU. In such embodiments, sample or particles are divided into two groups comprising M and N numbers of particles, respectively. The M number of particles are dispatched for processing on the GPU, whilst the N number of particles are dispatched for processing on the one or more processors or processor cores. N and M may be selected according to a respective computing capacity of the processors or cores of processors and the GPU.

Experiments have been conducted to determine the effectiveness of embodiments of the present invention. A computer workstation having dual Intel Xeon 5345 processors with a total of 8 cores, an Nvidia Fx4600 graphics card including a G80 GPU with 12 multi-processors and a Logitech web camera was used to capture video images. Face detection was performed every 10 frames and the re-initialisation process was performed if a tracking failure occurred. It was observed that for a predetermined number of samples or particles the use of more CPU cores in parallel provided an approximately linear speed-up for the method. Similarly, for processing by either a plurality of CPU cores or the GPU, as a number of samples or particles was increased a level of speed-up correspondingly increased. Furthermore, the combination of a plurality of CPU cores and the GPU, as in FIG. 6, provided a speed-up which exceeded that of either the plurality of CPU cores or the GPU alone.

It was found that the use of multiple information cues based on the colour histogram 331, edge histogram 332 and wavelet features 333 enabled embodiments of the present invention to track objects even in view of changes in illumination and rotation of the object, which was a face in the present examples.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of tracking an object in a video data, comprising:
   determining a plurality of particles for use in estimating a location of the object in the video data;
   allocating a first group of the plurality of particles to a graphics processing unit (GPU);
   allocating a second group of the plurality of particles to one or more processing units;
   determining a weight for each of the plurality of the particles, wherein:
      the weight for at least some of the first and second groups of particles are determined in parallel;
      the weight of two or more particles among the plurality of particles is determined substantially in parallel; and
      the weight of each of the plurality of particles is based on a plurality of information cues and a Bhattacharyya similarity function; and
   estimating the location of the object in the video data based upon the determined particle weights.

2. The method of claim 1, comprising dividing the plurality of particles amongst the one or more processing units, wherein each processing unit is arranged to determine the weight for each of the particles allocated thereto.

3. The method of claim 1, comprising dividing the plurality of particles amongst a plurality of processors in the GPU, wherein each processor is arranged to determine the weight for each of the particles allocated thereto.

4. The method of claim 1, comprising selecting a particle having a greatest weight from the plurality of particles.

5. The method of claim 1, wherein the plurality of information cues includes a colour histogram, an edge orientation histogram and wavelet features.

6. The method of claim 5, wherein a weight $P_n^{colour}$ of an nth particle based on the colour histogram is determined by:

$$P_n^{colour} = \exp\{-D^2(H_n^{colour}, H_{ref}^{colour})\} \text{ with}$$

$$D(H_n^{colour}, H_{ref}^{colour}) = \left(1 - \sum_{i=0}^{B-1} \sqrt{h_{i,n}^{colour} \cdot h_{i,ref}^{colour}}\right)^{1/2}$$

wherein D is the Bhattacharyya similarity function, $H_n^{colour}$ is a colour histogram in a HSV colour space for the nth particle and $H_{ref}^{colour}$ is a reference colour histogram for the nth particle.

7. The method of claim 5, wherein a weight $P_n^{edge}$ of an nth particle based on the edge orientation histogram is determined by:

$$P_n^{edge} = \exp\{-D^2(H_n^{edge}, H_{ref}^{edge})\} \text{ with}$$

$$D(H_n^{edge}, H_{ref}^{edge}) = \left(1 - \sum_{i=0}^{B-1} \sqrt{h_{i,n}^{edge} \cdot h_{i,ref}^{edge}}\right)^{1/2}$$

wherein $H_n^{edge}$ is an edge orientation histogram for the nth particle, $H_{ref}^{edge}$ is a reference edge orientation histogram and D is the Bhattacharyya similarity function.

8. The method of claim 1, wherein the weight for each of the plurality of particles is determined as a sum of weights determined according to each of the plurality of information cues.

9. A non-transitory computer-useable medium having a compute readable program code to implement a method for tracking an object in video data comprising:
   determining a plurality of particles for use in estimating a location of the object in the video data;
   allocating a first group of the plurality of particles to a graphics processing unit (GPU);
   allocating a second group of the plurality of particles to one or more processing units;
   determining a weight for each of the plurality of the particles, wherein:
      the weight for at least some of the first and second groups of particles are determined in parallel;
      the weight of two or more particles among the plurality of particles is determined substantially in parallel; and
      the weight of each of the plurality of particles is based on a plurality of information cues and a Bhattacharyya similarity function; and
   estimating the location of the object in the video data based upon the determined particle weights.

10. An apparatus for tracking an object in a video data, comprising:
    a first processing unit arranged to:
       determine a plurality of particles; and
       estimate a location of the object in the video data based upon a weight of each of the plurality of particles, wherein the weight of each of the plurality of particles is based on:
          a plurality of information cues selected from a colour histogram, an edge orientation histogram and wavelet features; and
          a Euclidean distance between a sample feature vector and a reference feature vector; and
    a graphics processing unit arranged to determine a weight for at least some of the plurality of the particles, wherein the weight of two or more particles among the plurality of particles is determined substantially in parallel.

11. The apparatus of claim 10, comprising a plurality of processing units, wherein the first processing unit is arranged to allocate a first group of the plurality of particles to the graphics processing unit and to allocate a second group of the plurality of particles to the plurality of processing units, wherein the graphics processing unit and the plurality of processing units are arranged to determine the weights for at least some of the first group and the second group in parallel.

12. The method of claim 10, wherein a weight $P_n^{wavelet}$ of an nth particle based on the edge orientation histogram is determined by:

$$P_n^{wavelet} = \exp\{-Eu(V_n^{wavelet}, V_{ref}^{wavelet})\} \text{ with}$$

$$Eu(V_n^{wavelet}, V_{ref}^{wavelet}) = \left(\sum_{i=0}^{B-1} (v_{i,n}^{wavelet} - v_{i,ref}^{wavelet})^2\right)^{1/2}$$

wherein Eu is the Euclidean distance between the sample feature vector $V_n^{wavelet}$ and the reference feature vector $V_{ref}^{wavelet}$.

* * * * *